Figure 1:
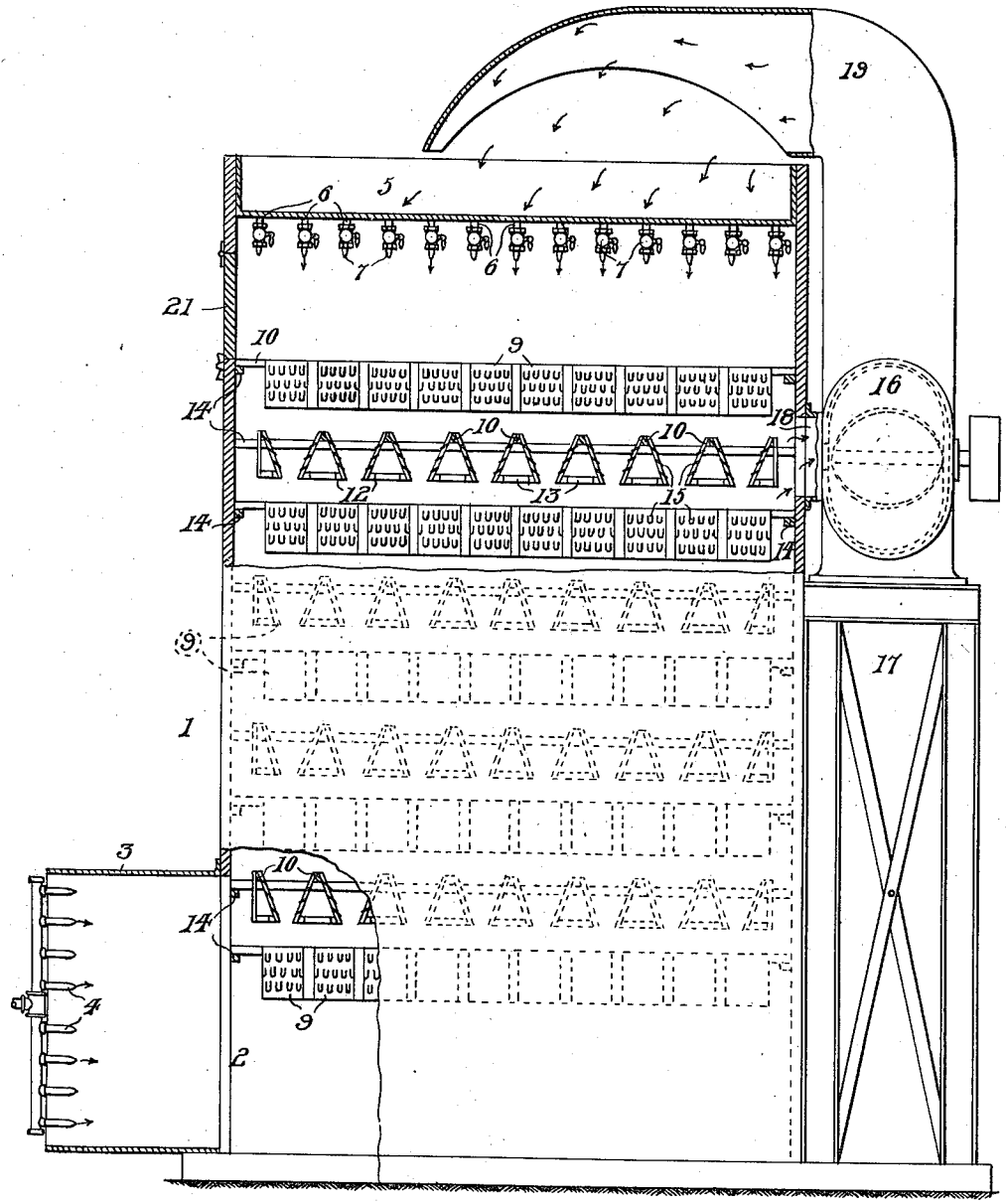

F. W. HAAS.
LIQUID COOLING APPARATUS.
APPLICATION FILED JAN. 8, 1910.

984,660.

Patented Feb. 21, 1911.
2 SHEETS—SHEET 1.

WITNESSES

INVENTOR
F. W. Haas
by F. N. Barber
His attorney

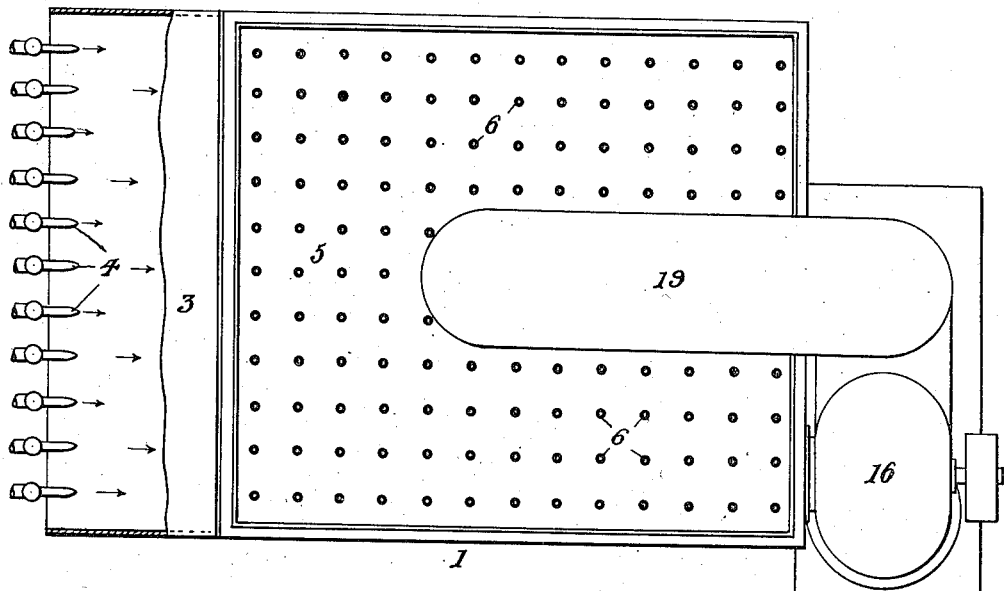
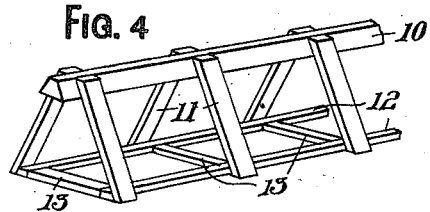
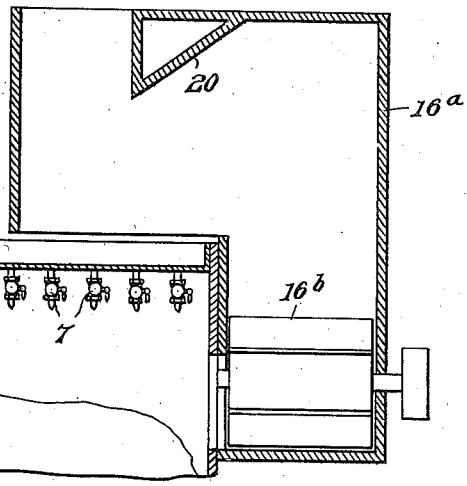
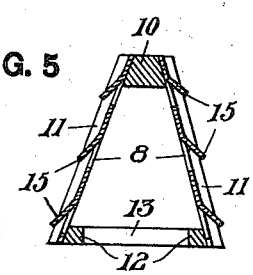
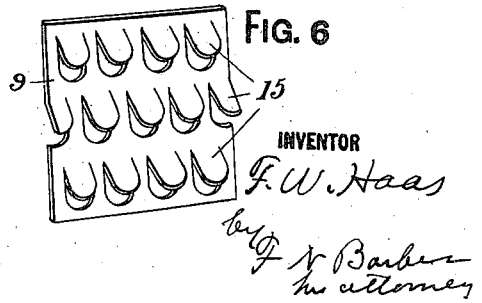

UNITED STATES PATENT OFFICE.

FREDERICK W. HAAS, OF PITTSBURG, PENNSYLVANIA.

LIQUID-COOLING APPARATUS.

984,660.  Specification of Letters Patent.  Patented Feb. 21, 1911.

Application filed January 8, 1910. Serial No. 536,989.

*To all whom it may concern:*

Be it known that I, FREDERICK W. HAAS, a citizen of the United States, residing at Pittsburg, in the county of Allegheny and State of Pennsylvania, have invented or discovered new and useful Improvements in Liquid-Cooling Apparatus, of which the following is a specification.

My invention relates to apparatus for cooling fluids by submitting them to the action of a partial vacuum.

The object of my invention is to cool for use heated water which is ordinarily conducted away in waste pipes.

I have designed my invention for use in cooling the condenser water from ice-making machines, but it is evident that it may be employed for cooling fluid derived from any source and designed for any purpose.

Referring to the accompanying drawings, Figure 1 is an elevation of one form of my invention with portions broken away to show the internal structure; Fig. 2, a plan thereof with a portion broken away; Fig. 3, a vertical section of a portion of my invention showing a modification of the fan-casing and attachments; Fig. 4, a perspective of one end of a plate-holding cooling frame; Fig. 5, a cross-section of a plate-holding frame with the cooling plates thereon; and Fig. 6, a perspective of one of the said cooling plates.

On the drawings, 1 designates a rectangular box, having across the lower portion of one end the opening 2, around which I secure the sprayer-casing 3 having its outer end open and provided with a number of sprayer nozzles 4 projecting into the same. In the top of the box 1, I place the hot-water receptacle 5 having its top open and its bottom provided with numerous holes, in which I place sprayer, or discharge tubes 6, provided preferably with regulating valves 7. As shown the tips of the spraying tubes have contracted nozzles to cause the water to issue with sufficient force to form sprays.

Within the box 1 below the receptacle 5, I place cooling frames 8 arranged in several horizontal groups arranged one over the other, as clearly shown on Fig. 1. Each frame consists of a framework covered with the perforated cooling plates 9. Each framework is preferably constructed as follows: A wooden plate or support 10 having its sides tapering upwardly has secured thereto, the oppositely arranged pairs of supports or pieces 11, the members of each pair diverging downwardly. To the lower ends of the pieces 11 on one side of the plate 10 I secure the piece 12 and to the lower ends of the pieces 11 on the other side of the plate 10 I secure another piece 12 which is parallel with the first named piece 12. The pieces 12 are spaced apart and held in place by means of the pieces 13. The ends of the plates are supported on the cleats 14 secured to the interior faces of the sides of the box 1. To the sides of each framework, I secure the metal plates 9, which have horizontal rows of tongues 15 stamped therefrom, the holes in consecutive rows being staggered. The tongues remain attached to the plates at their upper ends and project outwardly away from the framework so as to form sloping shelves upon which the water from the receptacle 5 flows. The frames are arranged in tiers or groups, each group consisting of a series of parallel frames. The frames in consecutive groups are arranged at right angles as shown on Fig. 1 to cause a greater subdivision of the falling water and to break up any direct routes of travel of air from the casing 3 to the fan-casing, soon to be described. At the upper portion of the side opposite the casing 3, I place the fan-casing 16 resting on the trestle 17. The fan-casing draws air from the box 1 through the opening 18 opposite the upper groups of frames, preferably as shown on Fig. 1. From the fan-casing the air is blown through the pipe 19 which opens downwardly over the receptacle 5, so that any water carried along with the air will be deflected back into the receptacle.

The receptacle having been supplied with hot or warm water, the pipes 6 having been opened, and the fan having been set in operation, air is drawn into the casing 3 and charged with moisture from the spray pipes 4. From the casing 3 the moisture-laden air is drawn into the box 1 through and around the cooling frames and through the water falling from the receptacle 5. From the box 1 the air passes through the opening 18 into the fan-casing 16, from which it is driven through the pipe 19, whose downwardly turned outer end deflects any water in the air into the receptacle 5. As the air passes through the casing 3 it is rarefied and caused to expand, causing the absorption of considerable heat by the vapor dragged along from the sprayers 4. The expansion of the air and the water issuing from the spray pipes 4 reduces the temperature of both materially before the misty spray resulting from the mixture of the air and water enters the box 1. The rarefaction of the air and vapor continues in the box 1 where the cooled air from the casing 3 meets the metal of the frames and cools them and also meets the falling finely subdivided water or spray from the pipes 6 and directly cools it. The water in the form of spray and the water condensed from the spray coming in contact with the plates 9 imparts a large part of their heat thereto, which is carried off by the fan and discharged through the pipe 19. The cooling of the spray from the receptacle 5 is caused directly by contact with the rarefied cooled air and also indirectly by the air which cools the plates 9.

In Fig. 3, I show a fan casing 16ª which may be of wood. Within the casing 16ª is the fan 16ᵇ which draws the air from the box 1 and discharges it into the said casing, which has a portion overhanging the receptacle 5 and having its bottom open. In the upper part of the casing 16ª is an inclined deflector 20 arranged to direct any water swept along with the air into the receptacle 5.

It will be understood that the rarefied condition of the air in the box 1 will assist gravitation in forcing the water through the pipes 6 and thus increase the fineness of the subdivision of the sprays therefrom.

I provide the door 21 whereby access may be had to the interior of the box below the pipes 6 for repairs or other purposes.

I claim—

1. In a cooling apparatus, means for causing water to fall in a state of fine subdivision, means for passing through the same a current of rarefied air, and means for supplying the air with cool water in a subdivided state prior to its contact with the falling water.

2. In a cooling apparatus, means for causing water to fall in a state of fine subdivision, means for passing through the same a current of rarefied air, and means for returning to the water supply any water carried with the air.

3. In a cooling apparatus, a box, a receptacle therein for water to be cooled, spraying nozzles to lead the water in the form of spray into the box below the receptacle, metal covered cooling frames in the path of the spray and of the falling water condensed from the spray, and means for causing air to pass through the spray and the falling water and in contact with the cooling frames.

4. In a cooling apparatus, a box, cooling frames therein having sloping metallic sides and arranged in groups one above another, the frames of each group being parallel, means for causing the water to be cooled to flow over the said metallic sides, and means for cooling the said sides.

5. In a cooling apparatus, a box, elongated cooling frames therein having sloping metallic sides and arranged in groups one above another, the frames of each group being parallel and the frames of consecutive groups extending in different directions, means for causing the water to be cooled to flow over the said metallic sides, and means for cooling the said sides.

6. In a cooling apparatus, a box, cooling frames therein having sloping metallic sides and arranged in groups one above another, the frames of each group being parallel and the said sides having outwardly and downwardly extending tongues, means for causing the water to be cooled to flow over the said metallic sides, and means for cooling the said sides.

7. In a cooling apparatus, a cooling frame, having inclined surfaces, provided with staggered metallic tongues over which the water to be cooled flows and by which it is subdivided.

Signed at Pittsburg, Pa., this 6th day of January 1910.

FRED. W. HAAS.

Witnesses:
F. N. BARBER,
ANNA R. BEATTY.